United States Patent
Aouine et al.

(10) Patent No.: US 7,482,862 B2
(45) Date of Patent: Jan. 27, 2009

(54) DEMODULATION METHOD AND APPARATUS

(75) Inventors: Tarik Aouine, Antibes (FR); Frederic Coutant, Grasse (FR); Michel Gaeta, La Valette du Var (FR)

(73) Assignee: Aisin Seiki Kabushiki Kaisha, Aichi-ken (JP)

(*) Notice: Subject to any disclaimer, the term of this patent is extended or adjusted under 35 U.S.C. 154(b) by 124 days.

(21) Appl. No.: 11/729,843

(22) Filed: Mar. 30, 2007

(65) Prior Publication Data

US 2007/0230624 A1    Oct. 4, 2007

(30) Foreign Application Priority Data

Mar. 31, 2006    (FR) ..................... 06 02852

(51) Int. Cl.
*H03D 1/00* (2006.01)
*H03D 3/00* (2006.01)
*H04L 27/14* (2006.01)

(52) U.S. Cl. .................. 329/300; 375/324; 375/334

(58) Field of Classification Search ......... 329/300–303; 375/316, 320, 322, 324, 334–337
See application file for complete search history.

(56) References Cited

U.S. PATENT DOCUMENTS 5,999,857 A    12/1999    Weijand et al.
7,043,680 B2 *    5/2006    Aizawa ...................... 714/776
2005/0063491 A1    3/2005    Saloka

FOREIGN PATENT DOCUMENTS

| CA | 2 306 846 A1 | 5/1999 |
| EP | 1 187 346 A2 | 3/2002 |
| EP | 1 589 714 A1 | 10/2005 |
| FR | 2 846 814 A1 | 5/2004 |
| FR | 2 846 815 A1 | 5/2004 |
| FR | 2 846 825 A1 | 5/2004 |
| FR | 2 859 336 A1 | 3/2005 |

* cited by examiner

*Primary Examiner*—David Mis
(74) *Attorney, Agent, or Firm*—Sughrue Mion, PLLC

(57) ABSTRACT

A demodulation circuit and method are provided. The demodulation circuit includes a transformation circuit which is configured to transform the received signal into a modified signal representation in which both amplitude-varying information and frequency-varying information are converted to a uniform representation; and a processing circuit which is configured to process the modified signal representation to demodulate the received signal based on the uniform representation. The method includes transforming the signal into a modified signal representation in which both amplitude-varying information and frequency-varying information are converted to a uniform representation; and processing the modified signal representation to demodulate the signal based on the uniform representation.

26 Claims, 7 Drawing Sheets

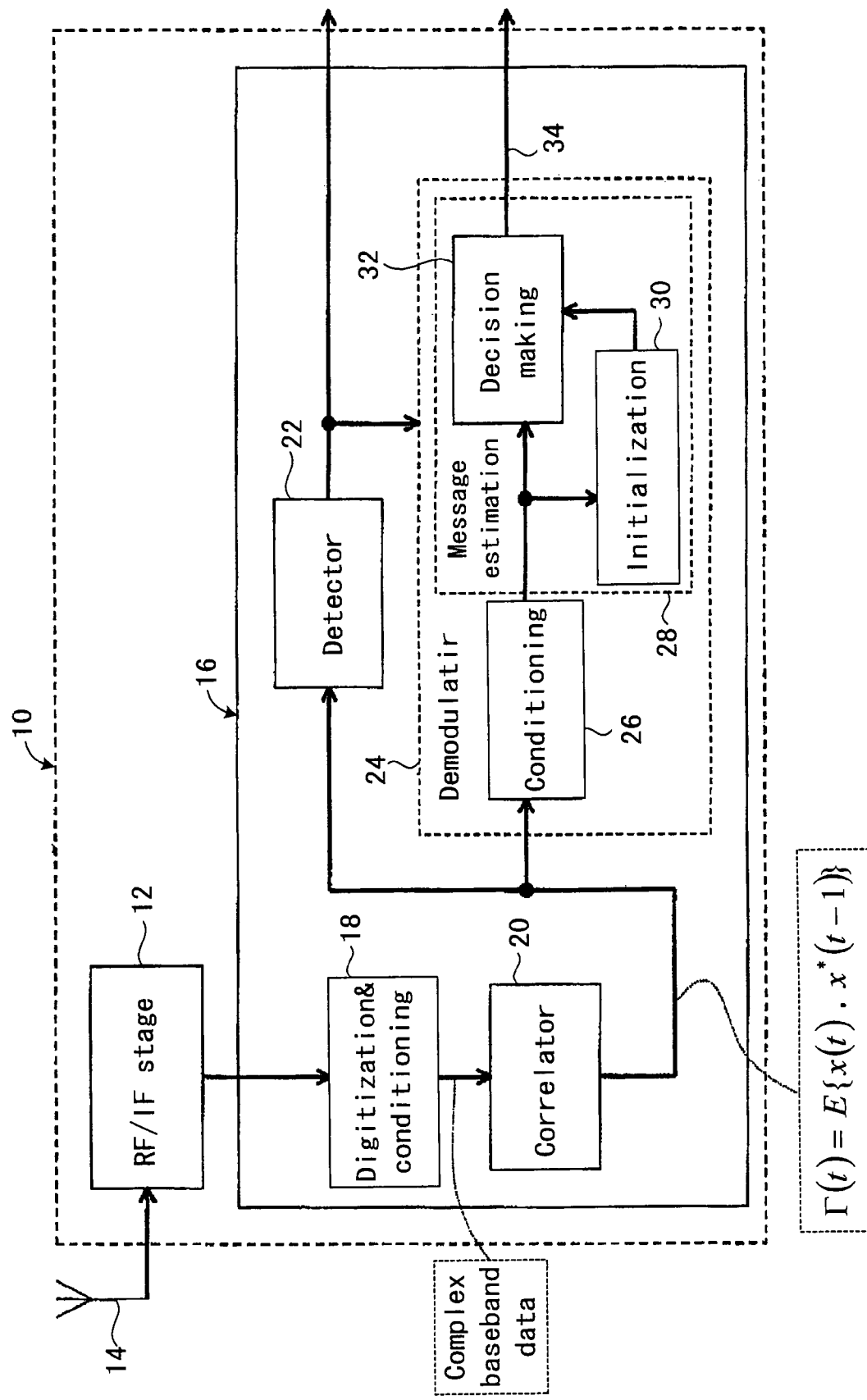

DEMODULATION METHOD AND APPARATUS

CROSS-REFERENCE TO RELATED APPLICATION

This application claims priority from French Patent Application No. 0602852 filed on Mar. 31, 2006 in the French Patent Office, the disclosure of which is incorporated herein by reference in its entirety.

BACKGROUND TO THE INVENTION

1. Field of the Invention

Methods and apparatuses consistent with the present invention relate to demodulation techniques capable of demodulating a Frequency Shift Keyed (FSK) and/or Amplitude Shift Keyed (ASK) received signal.

2. Description of the Related Art

Related art demodulation circuits that are capable of demodulating both FSK and ASK received signals are generally one of two types. A first type of circuit includes two dedicated demodulators, namely a first dedicated ASK demodulator and a second dedicated FSK demodulator, as well as a control switch for selecting an output of either the FSK or ASK demodulator. Examples of such demodulator circuits are known from CA-A-2306846, EP-A-1589714, and US-A-2005/0063491.

A second type of demodulation circuit includes an FSK demodulator and an ASK demodulator, and a logic circuit. Based on results of the demodulation from the two demodulators, the logic circuit selects the valid one. Alternatively, the logic circuit may decide whether to execute demodulation with the second demodulator based on a result from the first demodulator. An example of such a demodulation circuit is known from EP-A-1187346.

Such circuits involve significant hardware resources, occupy significant die space when implemented in an integrated circuit, and/or have a high computation load in order to implement both types of demodulation in parallel or in series.

Both types of demodulation circuit may perform poorly when demodulating a poor quality or damaged FSK signal in which one of the FSK tones may be of low amplitude such as the tone being close to the noise floor. Such a signal is difficult to decode by a related art FSK demodulation technique, and would also not be recognised as a true ASK signal. Such a poor quality FSK signal is not uncommon in remote control applications, because a transmitter will usually be a miniaturized circuit that may be of low cost, low complexity, or have poor operating tolerances or low transmission power. The problem may be compounded when the signal is transmitted or received in a noisy wireless environment.

Although not directed to a dual FSK/ASK capability, reference may be made to the FSK-specific demodulators described in published French patent application Nos. 2846814, 2846815, 2846825 and 2859336. These patent applications are directed to improved reception and demodulation of a wireless FSK signal in a noisy environment.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present invention a demodulator circuit for demodulating a received signal is provided. The demodulator circuit comprises a transformation circuit which is configured to transform the received signal into a modified signal representation in which both amplitude-varying information and frequency-varying information are converted to a uniform representation; and a processing circuit which is configured to process the modified signal representation to demodulate the received signal based on the uniform representation.

According to another aspect of the present invention, a demodulator circuit for demodulating a received signal is provided. The demodulator circuit comprises a complex baseband processing circuit which is configured to process the received signal in a complex baseband representation; and a discrimination circuit which is configured to process the complex baseband representation of the received signal to discriminate a plurality of signal components therein according to a amplitude and frequency variation of the signal components.

According to another aspect of the present invention, a receiver for receiving a signal is provided. The receiver comprises a demodulator circuit comprising a transformation circuit which is configured to transform the received signal into a modified signal representation in which both amplitude-varying information and frequency-varying information are converted to a uniform representation; and a processing circuit which is configured to process the modified signal representation to demodulate the received signal based on the uniform representation.

According to another aspect of the present invention, a receiver for receiving a signal is provided. The receiver comprises a demodulator circuit comprising a complex baseband processing circuit which is configured to process the received signal in a complex baseband representation; and a discrimination circuit which is configured to process the complex baseband representation of the received signal to discriminate a plurality of signal components therein according to a amplitude and frequency variation of the signal components.

According to another aspect of the present invention, a method of demodulating a signal is provided. The method comprises transforming the signal into a modified signal representation in which both amplitude-varying information and frequency-varying information are converted to a uniform representation; and processing the modified signal representation to demodulate the signal based on the uniform representation.

According to another aspect of the present invention, a method of demodulating a signal is provided. The method comprises processing the signal in a complex baseband representation; and processing the complex baseband representation of the signal to discriminate a plurality of signal components according to a combination of amplitude and frequency variation.

According to another aspect of the present invention, a computer readable storage medium storing an executable algorithm, which when executed on a processor performs a method is provided. The method comprises transforming the signal into a modified signal representation in which both amplitude-varying information and frequency-varying information are converted to a uniform representation; and processing the modified signal representation to demodulate the signal based on the uniform representation.

According to another aspect of the present invention, a computer readable storage medium storing an executable algorithm, which when executed on a processor performs a method is provided. The method comprises processing the signal in a complex baseband representation; and processing the complex baseband representation of the signal to discriminate a plurality of signal components according to a combination of amplitude and frequency variation.

BRIEF DESCRIPTION OF THE DRAWINGS

The above and/or other aspects of the present invention will become more apparent by describing in detail exemplary embodiments thereof with reference to the attached drawing figures, wherein:

FIG. 1 is a schematic block diagram of a receiver for receiving a wireless communications signal according to an exemplary embodiment of the present invention;

DETAILED DESCRIPTION OF EXEMPLARY EMBODIMENTS OF THE PRESENT INVENTION

Figure 2A:
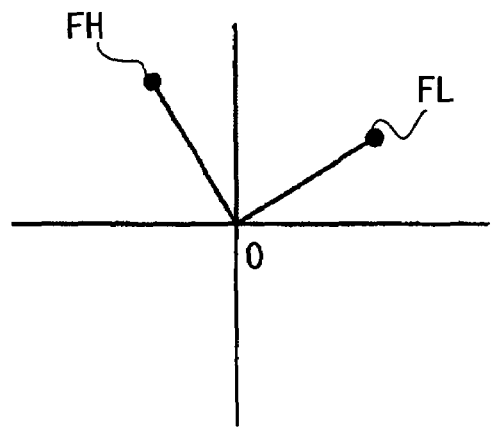
FIGS. 2A-2C are schematic illustrations of FSK, ASK and poor quality FSK signals, respectively, in a complex baseband coordinate space.

Referring to FIG. 1, a receiver 10 is illustrated for receiving and demodulating a wireless communication signal. The wireless communication signal may, for example, be an FSK and/or an ASK signal. The receiver 10 may find application in ea vehicle for receiving a remote control signal transmitted from, for example, a remote control key or key-card, or in a building security system, or any other application in which it is desirable to be able to receive and decode a wireless ASK or FSK modulated signal, or a poor quality or damaged FSK signal in which one of the FSK components may have a low amplitude making demodulation difficult or unreliable.

The receiver 10 comprises an analog Radio Frequency (RF) front-end stage 12 that receives an RF input signal from an antenna 14 and outputs a received signal ready for processing by a processing circuit 16. The RF front-end stage 12 may partly filter the received signal, and down-convert the received signal to an intermediate frequency (IF) signal suitable for digitization and digital processing by the processing circuit 16.

The processing circuit 16 may be implemented using one or more integrated circuits. For example, the processing circuit 16 may be implemented using an Application Specific Integrated Circuit (ASIC). The processing circuit 16 comprises a signal digitization and conditioning section 18; a correlator 20; a detector 22; and a demodulator 24. The demodulator 24 comprises a conditioning section 26 and a message estimation section 28. The message estimation section 28 comprises an initialization section 30 and a decision making section 32. The message estimation section 28 generates the demodulated code at output 34. The different sections 18-32 of the processing circuit may be implemented as respective dedicated hardware circuits, or as selectively configurable hardware circuits, or as software (e.g. processing algorithms) executed by a processor (e.g., a digital signal processor (DSP)), or as a combination of any of these. In the case of implementation by software, it may be appreciated that the schematic drawings may represent processing modules and/or information flow through the processing stages, but without any limitations as to execution timing.

The signal digitization and conditioning section 18 performs one or more of the following functions: analog-to-digital conversion; conversion to a complex baseband; fixed digital filtering; and controllably adaptive digital filtering depending on the environment in which the receiver 10 is being used. The function of the filtering is to remove noise and coherent interference components that could interfere with demodulation. The details of such functionality are known, and are illustrated, for example, in the aforementioned published French patent applications Nos. 2846814, 2846815, 2846825 and 2859336.

The correlator 20 applies a correlation function to further filter out noise in the signal, and to estimate the signal in the complex baseband.

In the complex baseband, each component of ASK or FSK modulation may be represented as a point in a co-ordinate system represented by real and imaginary part coordinate axes. Amplitude information and frequency information may be represented as polar coordinates with respect to the real and imaginary coordinate axes. Amplitude information may be represented by a vector length from an origin of the coordinate axes to the signal point. Frequency information may be represented by a polar angle of the vector. Accordingly, different frequencies may be represented as different polar angles. The transformation into a complex baseband may be performed by a down-conversion of the received signal. The transformation may further comprise a correlation step.

For example, referring to FIG. 2A; the high and low frequency tones FH and FL, respectively, of an FSK signal are represented by points having a different, angle with respect to the origin O. Assuming that the amplitude of the tones FH and FL is roughly equal, the distance from the origin is about equal. The specific angular relation between the FH and FL in the complex baseband has been used previously in the aforementioned published French patent applications Nos. 2846814, 2846815, 2846825 and 2859336 to enable the FSK tones to be detected and demodulated as FSK.

Figure 2B:
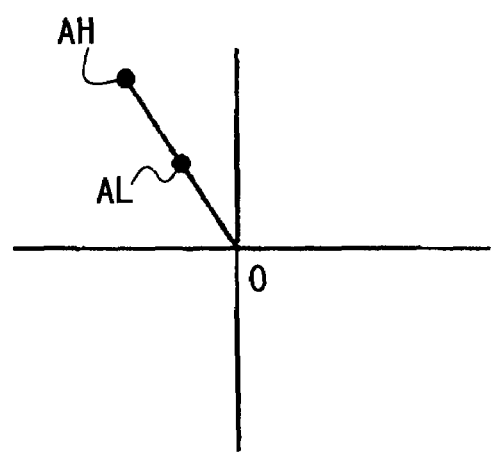

Referring to FIG. 2B, the high and low amplitude components AH and AL, respectively, of an ASK signal are represented by points having a same polar angle, but different distances (i.e., vector lengths) with respect to an origin. In such a case, the technique of the aforementioned published French patent applications Nos. 2846814, 2846815, 2846825 and 2859336 cannot demodulate the ASK components, as there is no angular difference between the components.

Figure 2C:
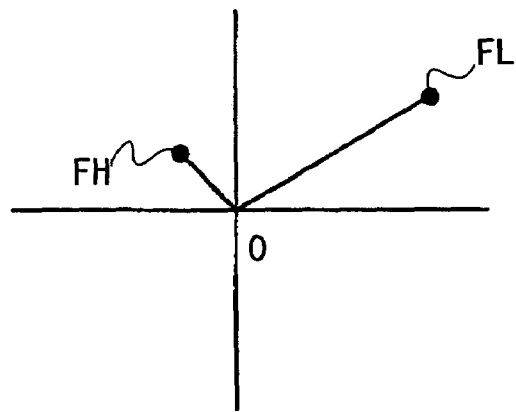

FIG. 2C represents a poor quality or damaged FSK signal in which one of the frequency tones (e.g., FH) has a much lower amplitude than the other frequency tone (FL). In such a case, the two points representing the frequency tones have both different polar angles and different vector lengths, making the points difficult to associate with either ASK or FSK modulation. In some cases, the lower amplitude tone may be so low that it approaches the noise floor, i.e., approaches the origin O.

According to an exemplary embodiment of the present invention, the tones of FIGS. 2A-2C in the complex baseband representation are transformed such that both frequency-varying information and amplitude varying information may be represented in a uniform representation. The uniform representation is then processed to demodulate the signal based on any of frequency and amplitude information that varies in the signal, or a combination of both frequency and amplitude information if both vary.

Figure 3A:
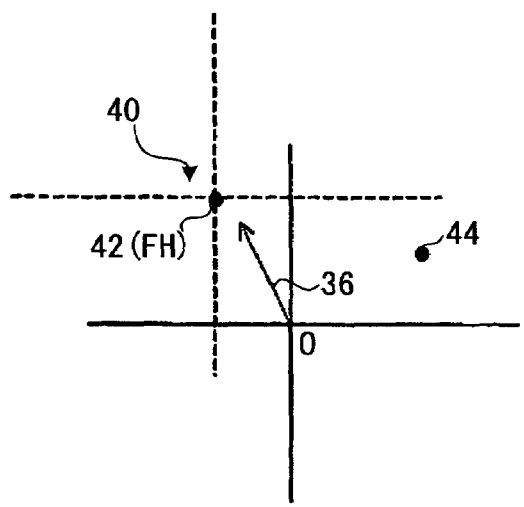
FIGS. 3A-3C are schematic illustrations showing use of an offset reference origin to represent the signal components of FIGS. 2A-2C, respectively in a uniform representation.
Figure 3B:
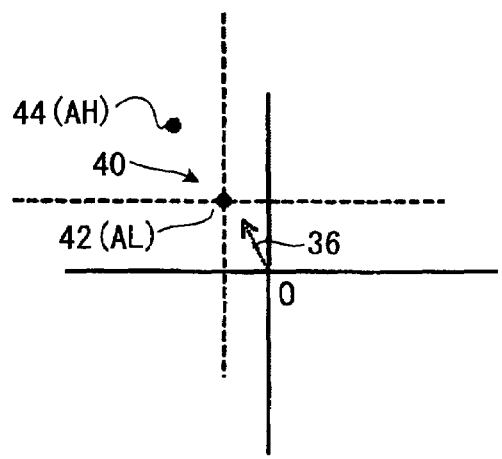
Figure 3C:
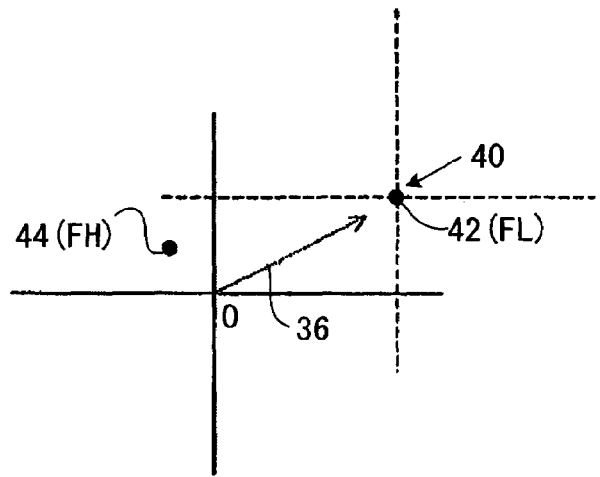

Referring to FIGS. 3A-3C, the transformation according to an exemplary embodiment of the present invention defines an origin offset, i.e., a new offset reference origin 40, that substantially coincides with, or is proximate or close to, one of the signal components 42 in complex baseband coordinates space. In the case of FIG. 3A, the frequency tone FH of FIG. 2A is used. The difference between the original origin and the offset origin is defined by a relative shift, i.e., a "basis-shift" complex value 36. The two components 42 and 44 of the frequency tones FH and FL of FIG. 2A, respectively, are then discriminated based on a relative proximity to the offset reference origin 40, irrespective of whether the signal components are in reality separated in frequency and/or amplitude. In FIGS. 3A-3C, the offset reference origin 40 is established to coincide with one of the signal components, e.g., a first received signal component denoted as the first signal component 42. Thus, in FIG. 3A, the tone FH of FIG. 2A is selected as the first signal component 42; in FIG. 3B, the tone AL of FIG. 2B is selected; and in FIG. 3C, the tone FL of FIG. 2C is selected. As may be seen in each of FIGS. 3A-3C, the first signal component 42 that is established and used to calculate the offset reference origin 40 is always at, or near, the offset reference origin 40, whereas a second signal component 44 is more distant from the offset reference origin 40. That is, an origin offset of the complex baseband is calculated representing an origin offset (i.e., a new offset reference origin) that would move the origin depending on the frequency and/or amplitude characteristics of at least one of the components of the signal. The new reference origin may correspond to the frequency and/or amplitude characteristics of one of the signal components. With this representation, one of the signal components is represented by being at (or relatively near) the new reference origin. The other signal component may be recognised by being not at (or being relatively remote from) the new reference origin. This uniform representation is equally valid whether the two components of the signal are different in amplitude (e.g., ASK), or different in frequency (e.g., FSK), or both (e.g., poor quality or damaged FSK).

Figure 4A:
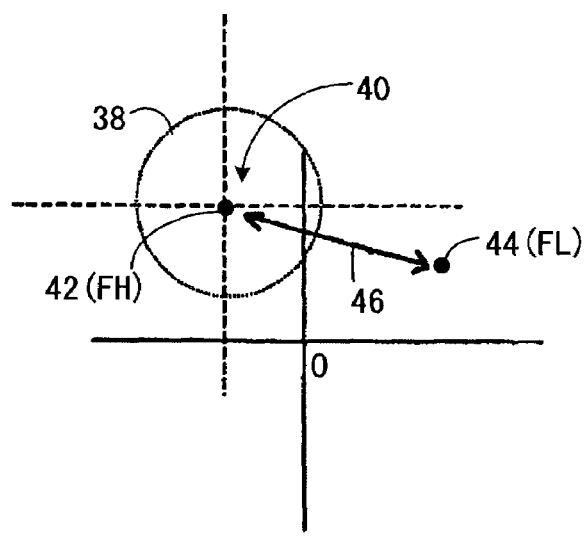
FIGS. 4A-4C are schematic illustrations showing use of a threshold to discriminate between the different signal components using the uniform signal representations of FIGS. 3A-3C, respectively.
Figure 4B:
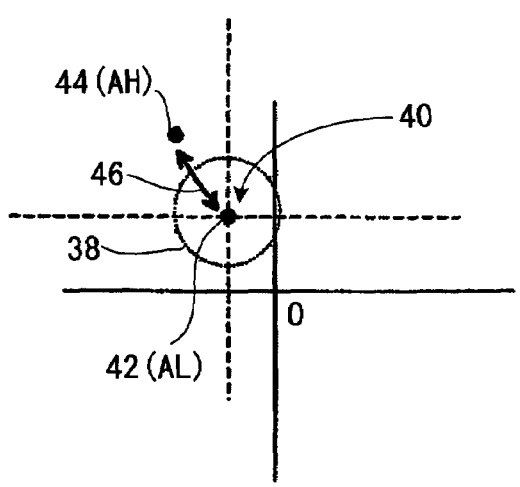
Figure 4C:
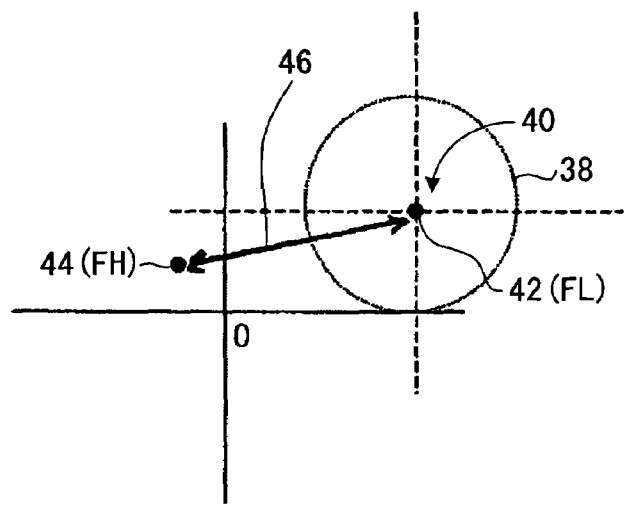

Referring to FIGS. 4A-4C, the second signal component 44 is discriminated from the first signal component 42 according to a vector length 46 with respect to the offset reference origin 40. The vector length 46 represents an amplitude. The proximity with respect to the offset reference origin 40 may be judged using a proximity threshold 38 (also referred to as an "Energy-threshold") around the offset reference origin 40. Amplitude values (with respect to the offset reference origin 40) falling inside a circle defined by the Energy-threshold 38 may be discriminated as signal values proximate to the offset reference origin 40. Values falling outside the circle defined by the Energy-threshold 38 may be discriminated to be other signal values. That is, whether a signal component is substantially at, or substantially remote from, the offset reference origin is detected. Such detection may be performed by measuring a vector length of a signal with respect to the offset reference origin, and comparing the measured vector length with a threshold (i.e., an energy threshold). A small vector length (e.g. smaller than the threshold) may be indicative of the signal component corresponding to the offset reference origin. A long vector length (e.g. greater than the threshold) may be indicative of the signal component remote from the offset reference origin.

It may be appreciated that the magnitude of the Energy-threshold 38 may vary depending on the different types of modulation, and according to the amplitude and/or frequency spacing of the two signal components. However, the technique is applicable in discriminating both frequency-varying information and amplitude-varying information, or a combination of both. That is, the same technique is equally valid for both ASK and FSK components.

Since the signal components may vary over time, for example due to noise or drift even during a single message, or due to filtering and sampling errors in the receiver, the position of the offset reference origin 40 in the complex baseband space, and/or the magnitude of the Energy-threshold 38, may be updated, so that one or both of these parameters may track changes in the signal components.

Moreover, when only one of the signal components may have been received, initial values for the offset reference origin 40 and the Energy-threshold 38 are calculated by the initialization section 30. These initial values are then updated dynamically to adapt to the signal components as the signal components are received. Modifications may be made to the exemplary embodiment for calculating approximate initial values for enabling the technique to be applied immediately when a message begins, and adapting the values to track the actual components of the signal.

Figure 5:
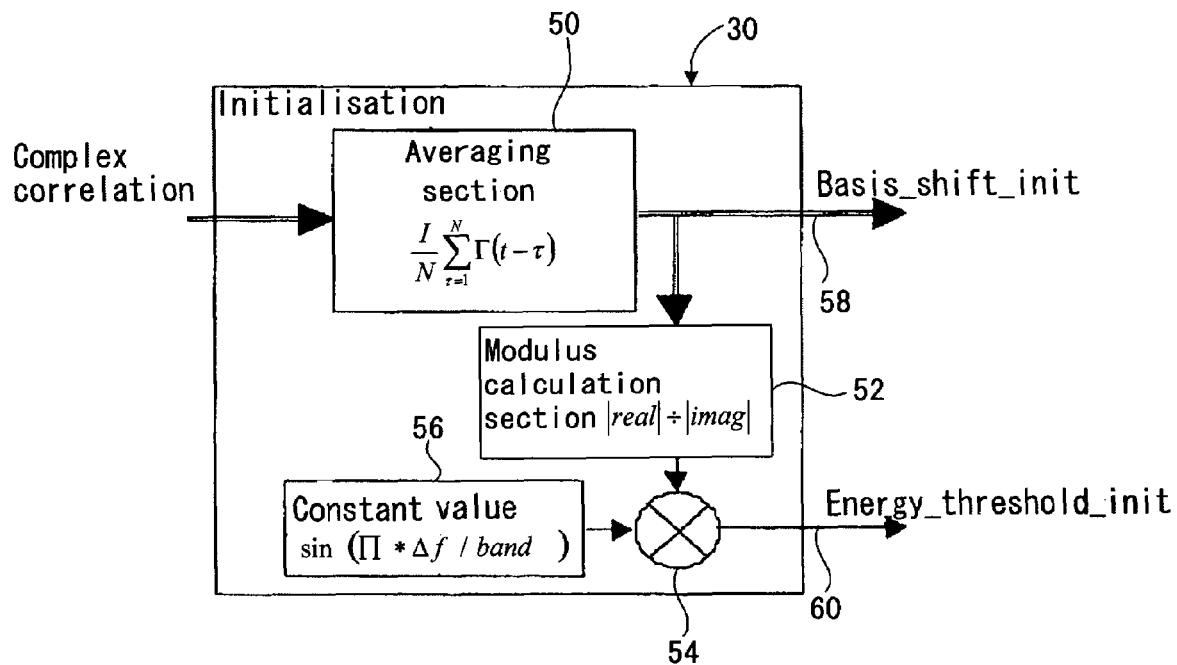
FIG. 5 is a block diagram of the initialisation section of the demodulator of the receiver of FIG. 1.

Referring to FIG. 5, the initialization section 30 comprises an averaging section 50, a modulus calculation section 52, and a multiplier 54 for multiplying the output from the modulus calculation section 52 by a constant value 56. The averaging section 50 estimates a value of a signal point in the complex baseband space, when a new message begins. The averaging section averages a first N sample points of the signal value. A value of N may be between 3 and 10. For example, N may be 5. The averaging section 50 may operate continuously, or it may be triggered when a new message (or a signal of interest) is detected by the detector 22. By estimating the value of the signal point, an initial offset is derived for the offset reference origin (namely, the offset or basis-shift for moving the origin to coincide with the respective signal value). This initial value is output to the decision making section 32 as the initial basis-shift signal 58.

An initial value for the Energy-threshold 38 is calculated based on a distance between the normal origin of the complex baseband space, and the offset reference origin defined by the basis-shift. The initial value represents an expected midway or intermediate threshold between the two signal components, although at the start of a message, only the first of the two signal components may be known. The initial value for the Energy-threshold 38 may nevertheless be calculated according to the parameters of the expected modulation. For example, in a case of FSK modulation with tones FH and FL each separated by a frequency deviation $\Delta f$ above and below a center frequency, the initial energy-threshold value signal 60 may be calculated by:

$$\text{Energy\_threshold} = \sin(\pi * \Delta f/\text{band}) * (\text{modulus (basis\_shift)})$$

where band denotes half of the sampling frequency.

Figure 6:
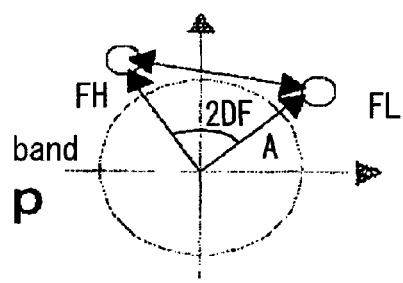
FIG. 6 is a schematic illustration showing a basis on which an initial value of the threshold of FIGS. 4A-4C may be calculated.

This calculation may be derived from an FSK specification. The $\Delta f$ and sampling frequency effectively allow defining a minimum distance (vector length) between the FSK tones. Referring to FIG. 6, the polar angle between the two frequency tones FH and FL in complex baseband space may be represented, in radians, as $2\pi\Delta f/\text{band}$. The value "A" in FIG. 6 corresponds to the amplitude of the tones (assuming equal amplitude). The distance between the two tones is defined by twice the sine of half of this angle multiplied by A. The halfway threshold, between the two frequencies, corresponds to the half of the distance A sin($\pi\Delta$f/band).

The value of "A" may be represented by the modulus of the basis-shift signal 58. A first order estimation of the modulus may be calculated by the modulus calculation section 52 as a sum of absolute values of the real and imaginary components of the basis-shift signal 58. The first order estimation avoids the need to calculate squares and a square root normally needed to calculate a modulus, and thus reduces the numerical calculation load. The value of the energy-threshold signal 60 is thus generated by the multiplier 54, where the constant value 56 corresponds to the value of sin($\pi\Delta$f/band). This value may be predetermined in advance as a constant according to the parameters of the signal for which the demodulator is intended.

Figure 7:
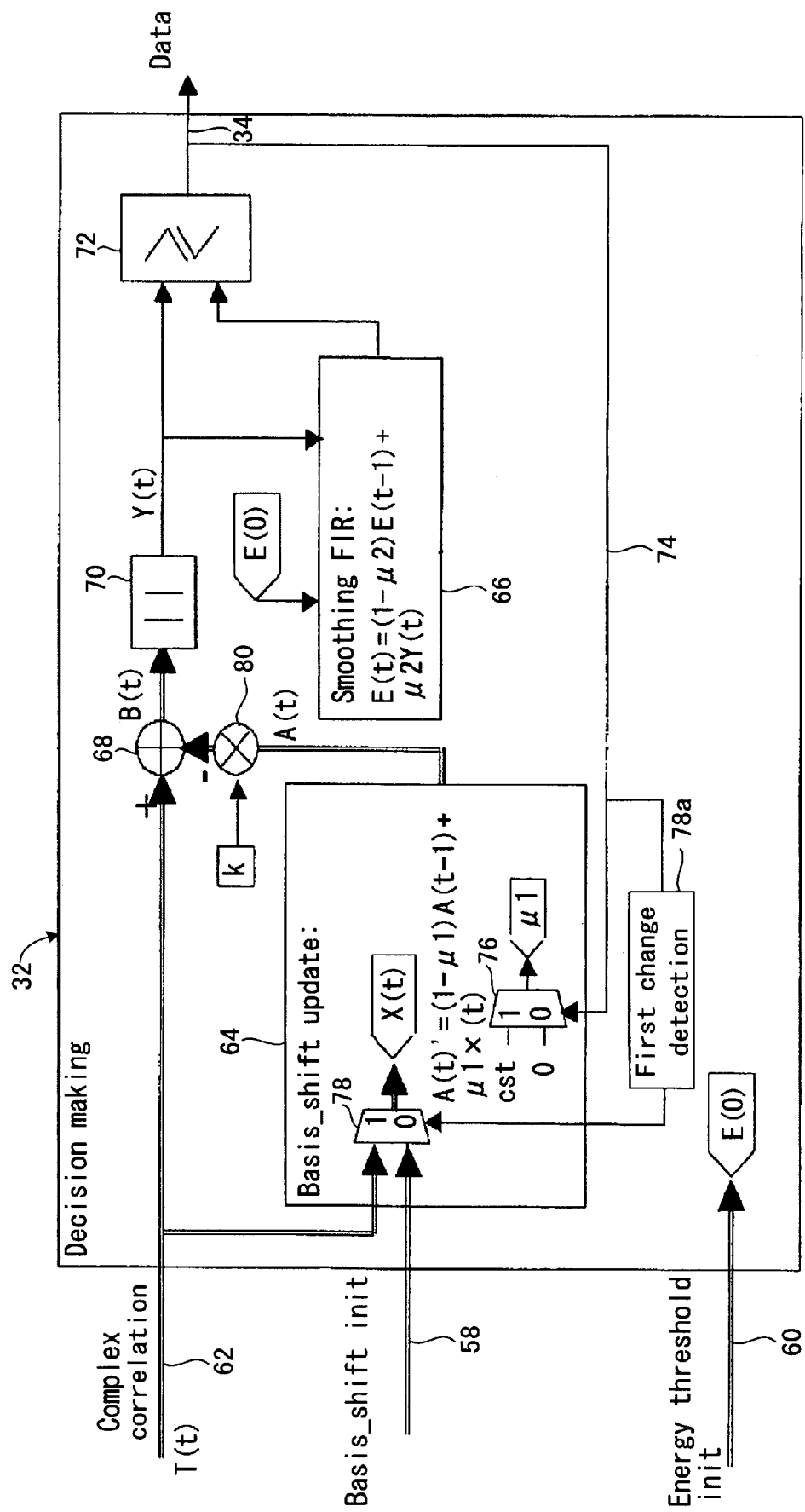
FIG. 7 is a schematic block diagram of a decision making section of the demodulator of the receiver of FIG. 1.

FIG. 7 illustrates the decision making section 32 of the demodulator 24 shown in FIG. 1 in more detail. The decision making section 32 receives as inputs the initial value basis-shift signal 58, the initial-value energy-threshold signal 60, and the complex correlation signal 62 generated by the correlator 20 after passing through the conditioning section 26 of the demodulator 24 (see FIG. 1). Although not shown in detail, the conditioning section 26 conditions the signal by filtering and down-sampling the correlation signal to match target message characteristics, such as the duration (Tchip) of a stable signal component of the expected FSK or ASK signal. The aim of such conditioning is to improve the signal to noise ratio by excluding signal components having a largely higher frequency than 1/Tchip.

The decision making section 32 comprises one or more of the following sections: a first updating section 64 for updating the value of the basis-shift parameter; a second updating section 66 for updating the value of the energy-threshold parameter; a transformation section 68 for applying the basis-shift transform to the signal 62 to shift the signal with respect to the offset reference origin into the transformed signal representation; and a processing section for processing the transformed representation. The processing section comprises a modulus calculation section 70 for calculating the vector length of the signal point with respect to the offset reference origin; and a comparator 72 for comparing the modulus output from the modulus calculation section 70 with the updated energy-threshold parameter from the second updating section 66 to generate the output 34.

The first updating section 64 is controlled by a feedback signal 74 from the output 34. The feedback signal 74 controls first switch 76 and second switch 78 in the first updating section 64. The first switch 76 controls whether or not the first updating section 64 is operative to perform updating. Updating may be performed for one of the signal components, e.g., the first signal component 42, in order for the offset reference origin to track changes in the first received component, such that the offset reference origin 40 corresponds to the first signal component 42. Moreover, updating may be deactivated when the second signal component 44 is received to prevent the second received component from influencing the value of the basis-shift parameter. The first switch 76 controls the updating by selecting either zero, or a constant value "cst" to use as a forgetting factor "$\mu1$" in the update equation for the basis-shift A(t)=(1−$\mu1$)*A(t−1)+$\mu1$*X(t), where X(t) denotes $\Gamma$(t), the complex correlation signal 62 or the initial value basis-shift signal 58 depending on the response of the second switch 78 detailed below. Because of the conditioning performed at the conditioning section 26 (i.e., low pass filtering and down sampling), a stable signal component may not result in a stable value of $\Gamma$(t) during one Tchip period. The value obtained by the complex basis-shift parameter may be underestimated. A constant correction factor "K" is applied by a multiplier 80 to correct such distortion. The value of K may be about 5/4.

The first updating section 64 and the averaging section 50 may together represent a basis-shift calculation section for calculating the basis-shift parameter.

The second switch 78 is responsive to the first occasion in each message on which the output toggles, detected by a first-change detector 78a. The second switch 78 selects whether the first updating section 64 performs the update calculation based on the initial value of the basis-shift parameter signal 58, or the current value of the complex correlation signal 62. Initially, the initial basis-shift signal 58 may be used; after the first change, the complex correlation signal 62 may be used.

The second updating section 66 applies a smoothing function to the Energy-threshold parameter 38, such that the threshold may adapt to the first signal component 42 and the second signal component 44 as they are received. The smoothing function may be represented by E(t)=(1−$\mu2$)*E(t−1)+$\mu2$*Y(t) where E(t) denotes the Energy-threshold parameter 38, $\mu2$ denotes a forgetting factor, and Y(t) denotes a modulus of the signal vector with respect to the offset reference origin (i.e., the output of the modulus calculation section 70). The second updating section 66 performs updating continuously, such that both signal components may influence the value of the Energy-threshold parameter 38.

In a similar manner to the modulus calculation section 52 of the initialization section 30, the modulus calculation section 70 of the decision making section 32 calculates a first order approximation of the modulus, as a sum of absolute values of the real and imaginary components of the complex signal, in order to reduce the numerical computation load.

The comparator 72 generates the output signal 34 by comparing the output of the modulus signal Y(t) with the Energy-threshold parameter E(t). As explained previously, the modulus signal Y(t) denotes the vector length of the current signal with respect to the offset reference origin 40, and the energy-threshold parameter E(t) 38 denotes a threshold value for determining whether or not the current value of Y(t) is sufficiently close to the offset reference origin to represent the first signal component 42, or is sufficiently distant from the offset reference origin to represent the second signal component 44.

Figure 8A:
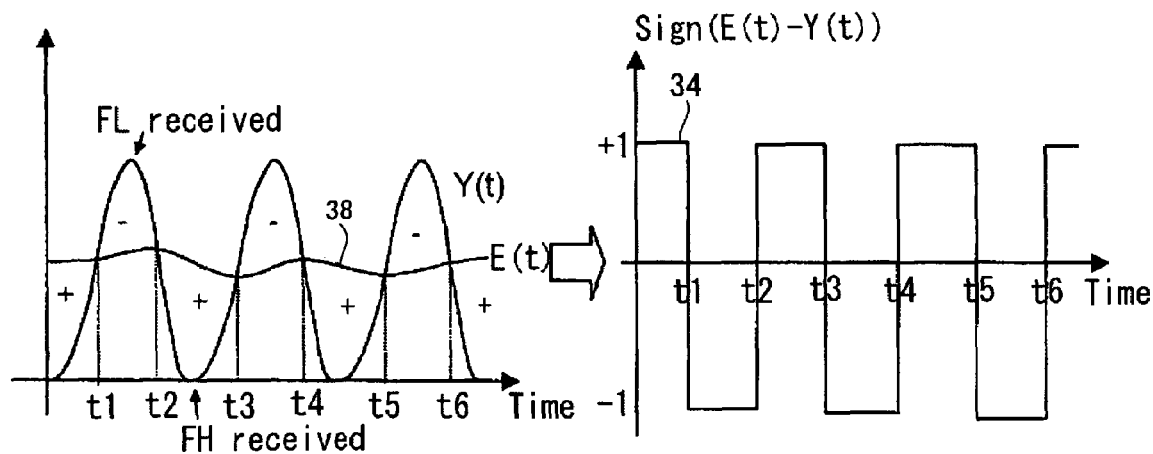
FIGS. 8A-8C are schematic illustrations showing generation of the demodulated output signals based on the threshold illustrated in FIGS. 4A-4C, respectively.
Figure 8B:
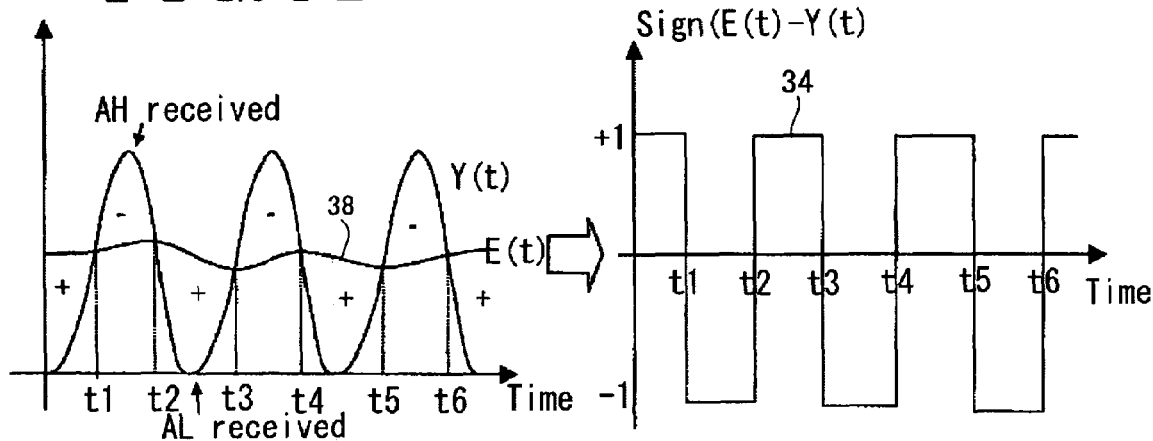
Figure 8C:
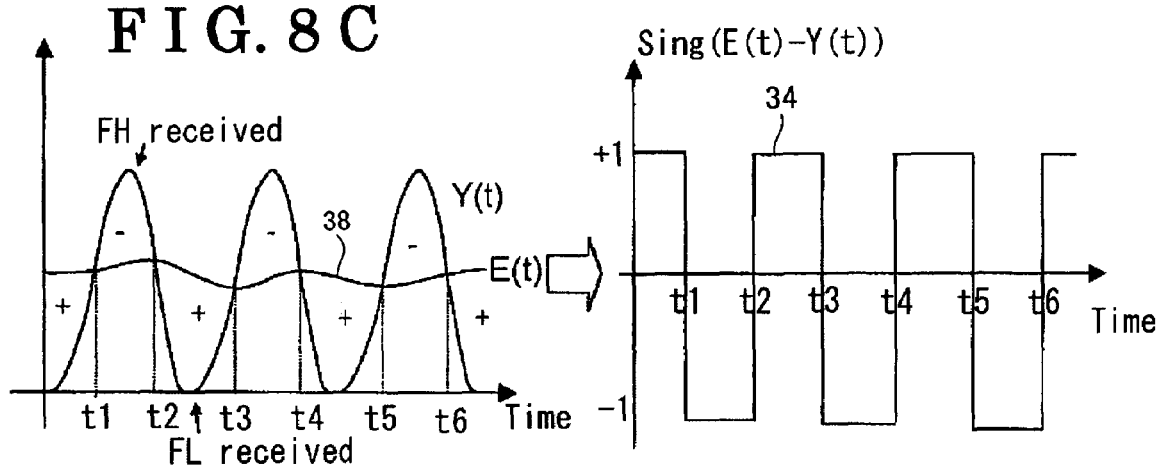

FIGS. 8A-8C illustrate the values of Y(t), E(t) and the output signal 34 for each of the signals of FIGS. 2A-2C, 3A-3C and 4A-4C, respectively. As may be seen in FIGS. 8A-8C, the value of E(t) 38 may vary slightly according to the current amplitude Y(t) for each signal component.

The following algorithm description illustrates an executable algorithm for implementing the demodulator 24 using a digital signal processor:

---

Demodulation algorithm

Input
    $\Gamma$: Correlation data after conditioning module.
    $\Delta$f: minimum frequency deviation of the FSK modulation
    Band: bandwidth after digitisation and conditioning section 18
    $\mu1$: forgetting factor for basic_shift update
    $\mu2$: forgetting factor for Energy_threshold smoothing.
    k: constant for basic shift tuning -continued Demodulation algorithm

```
Output
    Data:    demodulated code
Internal variables
    basis_shift: complex number used for basis-shift (origin offset)
    Energy_threshold : comparison value used for code decision
Constant: sin(πΔf/band)
function notation
    modul (X) = |real(X)| + |imag(X)|
    sin : sine function
``` mean: the mean operator on the integration time: $\text{mean}(X) = \frac{1}{N}\sum_{t=1}^{N} X(t)$

```
Begin when a received signal is detected
    Initialisation
    begin
        Compute basis-shift
        during limited time
            do
                compute correlation mean :
                    A(t) = mean(real(Γ(t))) + j mean(Imag(Γ(t)))
            enddo
        Compute energy-threshold
            E(t) = sin(πΔf/band) * modul(A(t))*k
        Output initialisation
            Data = +1;
    end
    Until detection switch to off
    do
        compute new correlation
            B(t) = Γ(t)- A(t) * k;
            Y(t)=modul(B(t));
        update code
            Data(t) = sign(E(t) – Y(t));
        after first data change
        do
            update basis shift
            if data=+1
                A(t)= (1–µ1) A(t)+ µ1* Γ(t);
            endif
            Update threshold
            E(t) = (1–µ2) E(t) + µ2 * Y(t);
        enddo
    enddo
End
```

Exemplary embodiments of the present invention provide a demodulation technique for demodulating FSK and ASK signals without any active decision about which type of modulation is applied, and avoid the selection of an appropriate type of demodulation depending on the decision result. Instead, the signal can be demodulated using the demodulation technique without knowing or deciding whether the signal is an FSK signal or an ASK signal. The demodulation technique is thus responsive to both amplitude-varying information and frequency-varying information in the signal, and may thus accurately demodulate poor quality or damaged FSK in which one of the FSK tones has a substantially reduced amplitude, for example, even down to the noise floor. The universal demodulation technique is robust, and accurately demodulates signals of poor tolerance, even when the signal characteristics may vary during a message. The demodulation technique is also efficient in terms of the computation load, and is suitable for implementation using low-cost circuitry.

The foregoing description is merely illustrative of exemplary embodiments of the present invention. Many modifications, developments and equivalents will be understood by one having ordinary skill in the art, and may be used without departing from the scope of the invention as defined in the following claims.

What is claimed is:

1. A demodulator circuit for demodulating a received signal, the demodulator circuit comprising:
   a transformation circuit which is configured to transform the received signal into a modified signal representation in which both amplitude-varying information and frequency-varying information are converted to a uniform representation; and
   a processing circuit which is configured to process the modified signal representation to demodulate the received signal based on the uniform representation.

2. The demodulator circuit according to claim 1, wherein the received signal comprises a complex baseband representation of the received signal, and the transformation circuit is configured to apply a transform such that the amplitude-varying information and the frequency-varying information are converted into a uniform representation in complex baseband space.

3. The demodulator circuit according to claim 2, wherein the transform comprises a shift transform to shift a signal value with respect to an offset reference origin.

4. The demodulator circuit according to claim 3, further comprising a basis-shift calculation circuit which is configured to calculate a basis-shift parameter representing the shift transform from an original origin to the offset reference origin.

5. The demodulator circuit according to claim 4, wherein the basis-shift parameter is a shift vector in complex baseband space.

6. The demodulator circuit according to claim 4, wherein the basis-shift calculation circuit is configured to calculate the basis-shift parameter such that the offset reference origin is proximate to a signal component of the received signal.

7. The demodulator circuit according to claim 6, wherein the offset reference origin is determined to substantially coincide with said signal component of the received signal.

8. The demodulator circuit according to claim 6, wherein said signal component is a first signal component of a message represented as a plurality of alternately changing signal components.

9. The demodulator circuit according to claim 4, wherein the basis-shift calculation circuit is configured to update the basis-shift parameter to match changes in said signal component, and to suspend updating when another signal component is present.

10. The demodulator circuit according to claim 1, further comprising a signal conditioning circuit positioned upstream of the transformation circuit, the signal conditioning circuit being configured to convert the received signal into a complex baseband representation.

11. The demodulator circuit according to claim 3, wherein the processing circuit is configured to discriminate a plurality of signal components according to a relative proximity of the signal components to the offset reference origin.

12. The demodulator circuit according to claim 11, wherein the processing circuit further comprises:
    a modulus calculation circuit which is configured to calculate a vector length of the signal value with respect to the offset reference origin in complex baseband space; and
    a comparator circuit which is configured to compare the vector length with a proximity threshold.

13. The demodulator circuit according to claim 12, further comprising a proximity threshold calculation circuit which is configured to perform an adaptive calculation of the proximity threshold based on a weighted average of signal component values.

14. The demodulator circuit according to claim 13, further comprising an initial value calculation circuit which is configured to calculate an initial value of the proximity threshold.

15. The demodulator circuit according to claim 14, wherein the initial value calculation circuit calculates the initial value of the proximity threshold according to an equation:

$$\sin(\pi * \Delta f / band) * (modulus(basis-shift))$$

wherein $\Delta f$ denotes a frequency shift of FSK frequency components on either side of a carrier frequency, and band denotes a parameter based on a sampling frequency.

16. A receiver for receiving a signal, the receiver comprising the demodulator circuit as defined in claim 1.

17. A demodulator circuit for demodulating a received signal, the demodulator circuit comprising:
a complex baseband processing circuit which is configured to process the received signal in a complex baseband representation; and
a discrimination circuit which is configured to process the complex baseband representation of the received signal to discriminate a plurality of signal components therein according to a amplitude and frequency variation of the signal components.

18. A receiver for receiving a signal, the receiver comprising a demodulator circuit as defined in claim 17.

19. A method of demodulating a signal, the method comprising:
transforming the signal into a modified signal representation in which both amplitude-varying information and frequency-varying information are converted to a uniform representation; and
processing the modified signal representation to demodulate the signal based on the uniform representation.

20. The method according to claim 19, further comprising storing the demodulated signal in a storage medium.

21. A computer readable storage medium storing an executable algorithm, which when executed on a processor performs the method as defined by claim 19.

22. The computer readable storage medium according to claim 21, wherein the computer readable storage medium comprises a semiconductor memory.

23. A method of demodulating a signal, the method comprising:
processing the signal in a complex baseband representation; and
processing the complex baseband representation of the signal to discriminate a plurality of signal components according to a combination of amplitude and frequency variation.

24. The method according to claim 23, further comprising storing the discriminated signal in a storage medium.

25. A computer readable storage medium storing an executable algorithm, which when executed on a processor performs the method as defined by claim 23.

26. The computer readable storage medium according to claim 25, wherein the computer readable storage medium comprises a semiconductor memory.

* * * * *